United States Patent [19]

Grohmann et al.

[11] 4,322,857

[45] Mar. 30, 1982

[54] METHOD AND CIRCUIT ARRANGEMENT FOR MONITORING A RADIO RECEIVER

[75] Inventors: Erich Grohmann, Feucht; Dirk J. Braak, Heroldsberg, both of Fed. Rep. of Germany

[73] Assignee: Felten & Guilleaume Fernemeldeanlagen GmbH, Nuremberg, Fed. Rep. of Germany

[21] Appl. No.: 970,123

[22] Filed: Dec. 11, 1978

[30] Foreign Application Priority Data

Dec. 10, 1977 [DE] Fed. Rep. of Germany ....... 2755221

[51] Int. Cl.³ ............................................. H04B 33/46
[52] U.S. Cl. ........................................ 455/226; 455/67
[58] Field of Search ............... 325/363, 364, 457, 455, 325/456, 473, 478, 67, 65, 62; 324/76 R; 455/226, 228, 67, 214; 329/131, 132

[56] References Cited

U.S. PATENT DOCUMENTS

| | | | |
|---|---|---|---|
| 3,737,781 | 6/1973 | Deerkuski | 325/363 |
| 3,750,177 | 7/1973 | Rooks | 325/363 |
| 3,845,484 | 10/1974 | Sawicki | 455/226 |
| 3,881,155 | 4/1975 | Saikaishi | 325/363 |
| 4,125,809 | 11/1978 | Mott | 325/67 |

FOREIGN PATENT DOCUMENTS 1034716  7/1958  Fed. Rep. of Germany .
1466552 11/1974  Fed. Rep. of Germany .

Primary Examiner—Tommy P. Chin
Attorney, Agent, or Firm—Michael J. Striker

[57] ABSTRACT

A radio receiver comprises an HF stage, an IF stage, and an LF stage connected in sequence. A first signal branch has an input connected to the IF stage and comprises in sequence a first rectifier, a first threshold circuit, a first delay stage and a switch whose output terminal controls the conduction state of a squelch switch connected in the output circuit of the LF stage. The output signal of the last-mentioned switch serves both to furnish reception-occurring and reception-pause signals and also, during normal operation, to control the squelch switch. A second signal branch has an input connected to the output of the LF stage and comprises a second rectifier and a second threshold circuit. The digital signals produced at the outputs of the first and second threshold circuits respectively indicate whether HF sensitivity and output-signal level are or are not acceptable. The delayed version of the first digital signal and the undelayed version of the second are applied to respective inputs of an AND-gate. A pulse generator responds to a reception-pause signal by enabling a third input opp the AND-gate and also activating a broadband noise-signal generator which then applies a broadband noise signal test impulse to the input of the HF stage.

7 Claims, 1 Drawing Figure

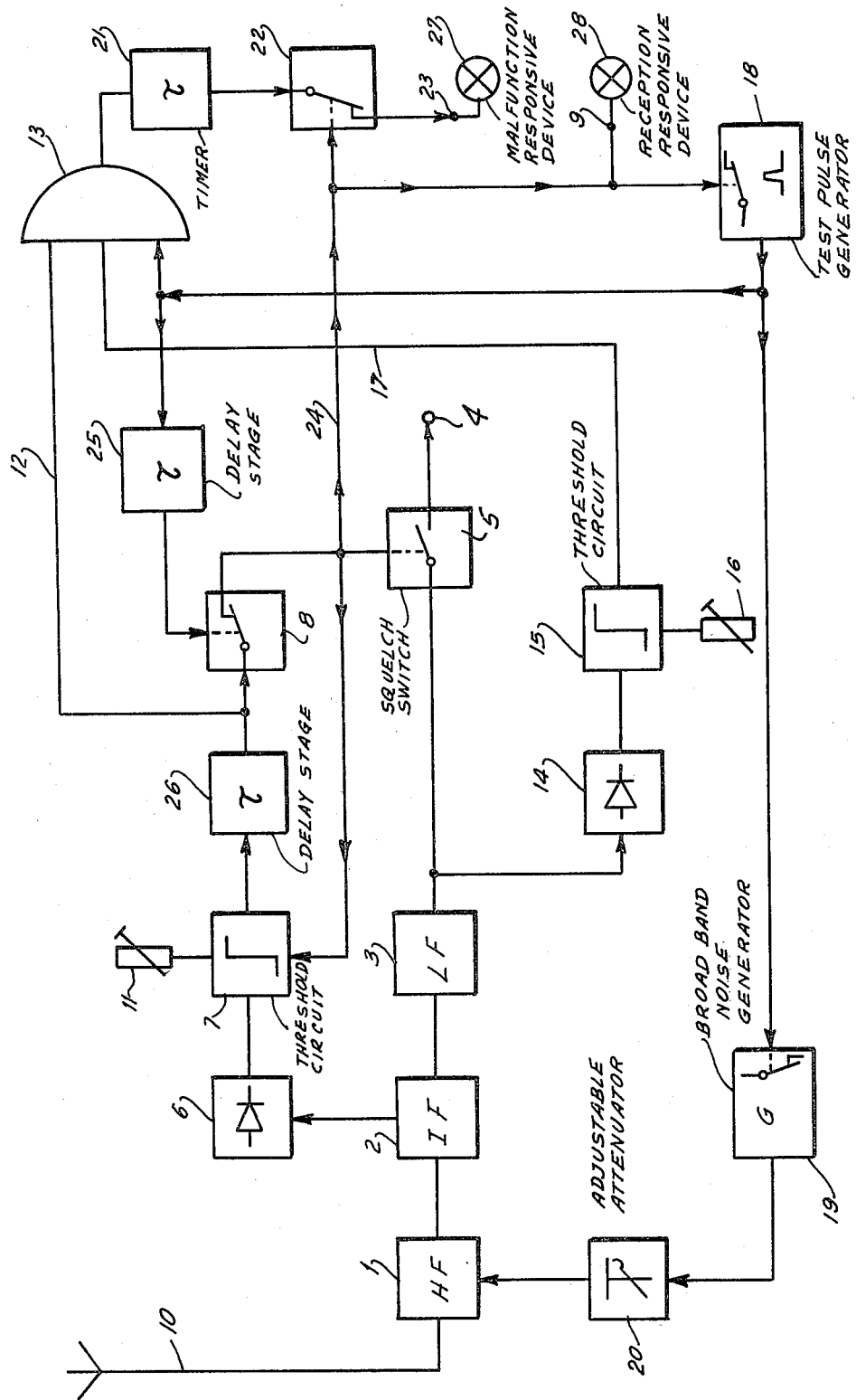

METHOD AND CIRCUIT ARRANGEMENT FOR MONITORING A RADIO RECEIVER

BACKGROUND OF THE INVENTION

The present invention concerns methods and circuit arrangements for automatically monitoring functions of a radio receiver, especially the HF sensitivity and the LF output-signal level of such receivers, during pauses in reception, the method and circuit arrangements in question being of the type wherein a HF test signal is applied to the input of the HF stage of the receiver and the version of the test signal appearing at the output of the LF stage of the receiver is rectified and then evaluated with respect to proper functioning or malfunction of the receiver.

An automatic monitoring method of the type in question is described in Federal Republic of Germany patent DT-PS 1,466,552. In that method, use is made of a warbling test signal whose frequency is cyclically varied within a predetermined frequency range centered about the HF frequency value which the radio receiver is to receive. The difference between the frequency value which the receiver is to receive and either limit of the frequency range through which the test signal is warbled is made greater than the signal bandwidth which the receiver is capable of receiving. If the receiver is capable of receiving a plurality of different channels, then the test signal employed is cyclically varied in frequency within a frequency range which is greater than the frequency range of all channels receivable by the receiver. In that latter instance, it is unnecessary to switch over from one test signal to another when monitoring proper receiver functioning at different ones of its receivable frequencies.

In that system, the test signal is transmitted through the HF stage, the IF stage, and the LF stage of the receiver and then rectified. The rectified test signal controls the operation of a relay which, in the event of receiver malfunction, generates an alarm or other malfunction indication and/or automatically switches on a stand-by or emergency receiver. In principle, such a malfunction indication and/or automatic emergency switchover does occur, with such prior-art system, in response to excessively low HF sensitivity of the receiver and in response to an excessive drop in the LF output-signal level. However, with the prior-art technique, it is extremely difficult to separately preselect, e.g., completely independently of each other, the drop in HF sensitivity and the drop in LF output-signal level which will actually result in a malfunction indication or an automatic emergency switchover.

Federal Republic of Germany patent DT-PS 1,034,716 discloses an automatic monitoring circuit for FM receivers in which, however, proper functioning of the receiver is not monitored beyond the output of the receiver's IF stage. The test signal there employed is a low-frequency voltage with which the inherent noise of the HF input stage itself is amplitude modulated. The test signal is automatically applied to the input amplifier of the HF stage, but only when the signal level at the output of the IF stage falls below a predetermined value, and simultaneously therewith the receiver's antenna is automatically switched off or disconnected. This automatic test-signal application occurs, however, even during normal and malfunction-free reception, if it should happen that at a particular moment only a weak signal is being received, and the antenna is not automatically switched back on or into circuit with the remainder of the receiver until after the automatically triggered test-signal cycle has finished. Accordingly, the automatic monitoring system leads to undesirable breaks in reception. Furthermore, the voltage of the noise generated within the HF stage itself, positively exploited in that system, is not constant over long periods of operation and fluctuates in dependence upon various operating conditions. This makes it impossible to precisely preestablish quantitatively what levels of malfunction or poor performance are and are not to be permitted to trigger a malfunction indication.

SUMMARY OF THE INVENTION

It is the general object of the present invention to provide a monitoring method and circuit arrangement of such a type that the monitoring criteria involving HF sensitivity and LF output-signal level can be separately preselected or preadjusted, and likewise of such a type that a response is developed even when only one of the plural malfunction criteria is met.

In accordance with the present invention, these objects are achieved as follows. A broadband noise-signal pulse is applied, as a test signal, to the input of the receiver's HF stage, and two versions of the noise signal are used for monitoring purposes, one version of the applied noise signal being taken off the IF stage of the receiver, rectified and applied to a first threshold stage whose threshold level marks the boundary between HF sensitivity values constituting malfunction and malfunction-free HF sensitivity values; the other version of the applied noise signal is derived from the output of the receiver's LF stage, is rectified and applied to a second threshold stage whose threshold level marks the boundary between LF output-signal levels corresponding to malfunction and those not corresponding to malfunction. The output signals of the two threshold stages are digital in character and are digitally processed in such a manner that, during the time of the noise-signal pulse, a malfunction-indicating signal is generated if one or both of the threshold-stage output signals is not produced. The adjustment or preselection of the threshold levels at which HF sensitivity is to be considered no longer sufficient and at which the LF output-signal level is to be considered no longer sufficient are performed independently of each other. Accordingly, each of the two malfunction criteria mentioned can be separately and exactly chosen to meet the requirement of the particular application and/or operating conditions involved. The noise-signal pulse here employed as the test signal contains all the signal components needed for both monitoring actions, and the derivation of the aforementioned two different versions of the applied noise-signal pulse is simple to perform. Likewise, the same automatic testing scheme can be employed, without modification, for all channels receivable by the receiver.

In a preferred embodiment of the inventive method, the malfunction-indicating signal is applied to a malfunction-responsive device via a first delay stage whose delay interval is longer than the interval between successive noise-signal test pulses. If the receiver is in a malfunction-free condition, a pulse is applied to the input of the just mentioned first delay stage with each noise-signal test pulse applied to the HF stage, and the delay stage produces an output signal only if such a pulse fails to be applied to it. In effect, this constitutes automatic monitoring of whether or not the monitoring action itself is occurring without malfunction. The malfunction-responsive device to which the malfunction-indicating signal is applied can comprise an indicator lamp and/or a relay, or the like, serving, e.g., to alert responsible personnel nearby or at a remote location, and/or a relay, or the like, can be used for automatic switch-on of a stand-by or emergency receiver; and so forth.

In a preferred embodiment of the inventive circuit arrangement, used to perform the inventive method, the output signal of a test-signal generator is applied to noise generator and to one input of a gating circuit. A second input of the gating circuit receives noise signals from the noise generator via a rectifier stage, the IF stage and the HF stage; whereas a third input of the gating circuit receives noise signals from the noise generator via a rectifier stage, the LF stage, the IF stage, and the HF stage.

A circuit simplification can be achieved in the case of receivers provided with squelching circuits, if the squelching circuit is of the type whose squelch-control signal is derived from the receiver's IF stage via the intermediary of a rectifier, a threshold stage and a delay stage. In such instances, the signal to be applied to the gating circuit for HF-sensitivity monitoring can be derived from the output of the already present delay stage of the squelching circuit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

The noise generator (19) can simply be realized by amplification of the (white) noise spectrum, appearing at an ohmic resistance, or by amplification of the (white) noise spectrum, produced by a diode current in the reverse direction. The bandwith of the amplifier shall at least be as broad as the RF-bandwith of the receiver.

BRIEF DESCRIPTION OF THE DRAWING

The single FIGURE depicts in schematic block diagram form one exemplary embodiment of a circuit arrangement which can be used for performing one exemplary and preferred version of the method of the present invention.

DESCRIPTION OF THE PREFERRED EMBODIMENTS

The radio receiver depicted in FIG. 1 comprises a conventional HF stage 1, a conventional IF stage 2, and a conventional LF stage 3. Connected between the output of LF stage 3 and the receiver output 4 per se is an electronic squelch switch 5 forming part of a squelching circuit. Squelch switch 5 is controlled by a signal derived from IF stage 2 (e.g., derived from the output signal of stage 2, or from the output signal of an intermediate amplifier internal to stage 2, etc.) through the intermediary of a rectifier stage 6, a threshold stage 7 (e.g., of Schmitt-trigger type), a time-delay stage 26, and a further electronic switch 8. In this embodiment, the squelch-control signal applied to the control input of electronic squelch switch 5 is additionally employed as a reception-occurring signal, i.e., indicating that the receiver is in the process of receiving a broadcast transmission. This reception-occurring signal is applied to the input terminal 9 of a reception-responsive device 28, here shown for the sake of concreteness as a simple indicator lamp, although it could equally well be a communications recorder, a time-of-reception recorder, or whatever. When the receiver's antenna 10 begins to furnish the receiver a broadcast transmission, at such a level as to exceed the level preset on threshold stage 7, the reception-occurring signal is produced at the output of switch 8, and is applied to reception-responsive device 28 and also to the control input of squelch switch 5, rendering the latter conductive. However, it is to be noted that the reception-occurring signal is not produced at the output of switch 8 instantly, but instead after the predetermined time delay introduced by delay stage 26; this will be discussed further below.

The threshold level of threshold stage 7 is selected or adjusted by means of an adjustable resistor 11. The output of the delay stage 26 is connected via a line 12 to the first input of an AND-gate 13. A second rectifier stage 14 is connected to the output of LF stage 3, followed by a second threshold stage 15 (e.g., likewise of Schmitt-trigger type) whose threshold level is adjustable by means of adjustable resistor 16. The output of theshold stage 15 is connected via a line 17 to the second input of AND-gate 13.

The output of a test-pulse generator 18 is connected to the third input of AND-gate 13 and also to the input of a noise generator 19. The output of noise generator 19 is connected, through the intermediary of an adjustable-attenuation attenuating stage 20, to the input of the HF stage 1, e.g., to the input terminal of the entire HF stage 1, or for example to the input of one of the intermediate amplifiers internal to the HF stage 1.

Connected to the output of AND-gate 13 is a delay stage 21 and the output of the latter is connected via an electronic switch 22 to the input terminal 23 of a malfunction-responsive device 27, here shown as a simple warning lamp, but alternatively a relay for automatically switching on a stand-by or emergency receiver, or whatever. Time delay stage 21 may for example comprise an integrated-circuit timer, of the type comprising a free-running pulse-generating oscillator which feeds pulses to the count-up input of a counter at a predetermined repetition frequency, with the output signal of AND-gate 13 being applied to the reset or zero input of such counter. In this way, each output signal from AND-gate 13 resets the counter, and the counter internal to delay stage 21 therefore cannot reach a count producing a signal at the output of stage 21, unless the next output signal from AND-gate 13 fails to arrive; more will be said concerning this further below.

Meanwhile, however, it will be evident that, instead of a digital counter such as just mentioned, delay stage 21 could equivalently comprise, by way of example, an analog timer in the form of an integrating capacitor which is slowly charged to finally reach a voltage producing a signal at the output of stage 21, but which is discharged in response to each output signal received from AND-gate 13 so that such capacitor-charging timing process must then be initiated anew.

The control input of switch 22 is connected via a line 24 to the output of switch 8, i.e., to receive the reception-occurring signal produced at the output of switch 8. The control input of test-pulse generator 18 is likewise connected to this line 24. The output of switch 8 is additionally connected to the control input of threshold stage 7 for adjusting the threshold level of stage 7.

The control input of switch 8 is connected via a delay stage 25 to the output of test-pulse generator 18. Delay stages 25, 26 can, for example, be comprised of RC delay circuits to the outputs of which fixed-threshold threshold stages are connected.

As already stated, in the illustrated embodiment the malfunction-responsive device 27 is shown as a simple indicator lamp. If in fact such an indicator lamp is to be used, then in order to achieve a persisting illumination of the lamp in response to a detected receiver malfunction, the lamp can be energized through the intermediary of a (non-illustrated) self-locking relay, i.e., to keep the lamp illuminated until a technician comes and switches the self-locking relay off.

The exemplary embodiment illustrated operates as follows:

During pauses in reception, i.e., when no reception-occurring signal is being furnished by switch 8 to line 24, switch 22 is conductive and also test-pulse generator 18 is enabled for operation. Test-pulse generator 18 produces, for example, output pulses of 100 ms duration each with a time interval of 30 seconds between successive pulses. Each such output pulse from test-pulse generator 18 activates noise generator 19 for a length of time corresponding to the test-pulse duration, i.e., so that broadband noise signals are briefly applied to HF stage 1 at intervals of, e.g., 30 seconds. The attenuating stage 20 weakly couples the noise-signal pulses into HF stage 1, so as to prevent overloading or detuning of the input circuitry of HF stage 1. The amplitude of the noise-signal pulses to be applied to HF stage 1 is selected by adjusting the adjustable attenuating stage 20. The amplitude level selected using stage 20 should be such that the version of this applied noise signal appearing at the input of threshold stage 7 exceeds the threshold level of stage 7 for the case where the receiver is in order and no malfunction exists. Stage 20 should be adjusted such that the version of the applied noise-signal test pulse appearing at the input of threshold stage 7 exceeds the threshold level of the latter by, for example, 6 dB. In this embodiment, it happens that threshold stage 7 is already present in the circuit as part of its squelching circuitry, i.e., for the control of squelch switch 5. Accordingly, the adjustable resistor 11 with which threshold stage 7 is provided would here be used to adjust the threshold level of stage 7 for normal squelching action, and therefore, i.e., in this embodiment, it is the adjustment of attenuating stage 20 which predetermines what the minimum limit of acceptable HF sensitivity will be, i.e., what minimum HF sensitivity must exist if the malfunction-detecting circuitry is not to produce a malfunction-indicating signal.

The threshold level of threshold stage 15 is adjusted by means of adjustable resistor 16. This threshold level should be so selected as to exceed the malfunction-free level of the version of the noise-signal test pulse appearing at the input of threshold stage 15. I.e., the version of the test pulse appearing at the input of threshold stage 15 should just fail to exceed the threshold level of stage 15, in the event that the level of this version of the test pulse has dropped below its nominal or malfunction-free value by, e.g., an amount of 6 dB.

In this embodiment, delay stage 26 would anyway be present, i.e., as part of the receiver's squelching circuitry. However, in so far as the malfunction-detecting circuitry of the receiver is concerned, the purpose of delay stage 26 is to delay the output signal produced at the output of stage 7 in response to a noise-signal test pulse, i.e., delay its application to the input of switch 8, until after switch 8 has been rendered conductive, via delay stage 25, by the test pulse produced at the output of test pulse generator 18. Othersie, in this embodiment, this output signal from threshold stage 7, i.e., the output signal resulting from the noise-signal test pulse itself, would instantly appear at the output of switch 8, just as though it were a reception-occurring signal, and be transmitted via line 24 to the control input of test pulse generator 18, disabling or deactivating the latter before the test-pulse action could even get underway. In this embodiment, the delay interval introduced by delay stage 26 should be greater than the delay interval introduced by delay stage 25. For example, the delay interval of stage 26 could in this embodiment be 40 ms. The delay interval of stage 26 must, however, be shorter than the duration of the test pulse itself.

Let it be assumed that the receiver is in perfect working order and that a pause in reception occurs. The disappearance of the reception-occurring signal on line 24 enables the test-pulse generator 18, and a "1" signal of duration 100 ms appears at the output of the latter. This "1" signal is applied to the bottom input of AND-gate 13 and also activates noise generator 19 so that a 100-ms noise-signal test pulse is applied to the input of HF stage 1. Because the receiver is assumed to be in perfect working order, the threshold level of stage 15 is exceeded, and the latter applies a "1" signal to the middle input of AND-gate 13. For the same reason, threshold stage 7 applies a "1" signal, via line 12, to the upper input of AND-gate 13, but not until after elapse of the 40-millisecond delay introduced by stage 26. Thus, 40 ms after initiation of the test pulse, all three inputs of AND-gate 13 are in receipt of "1" signals, and gate 13 produces at its output a "1" signal which resets the timer 21, so that the latter will initiate, or more precisely reinitiate a 100-second-long timing cycle. If this 100-second-long timing cycle were allowed to continue on to completion, a signal would then be produced at the output of stage 21; however, this does not happen because, after only 30 seconds the next test pulse is initiated, and 40 ms thereafter the next such "1" signal is produced at the output of AND-gate 13 and timing stage 21 is reset, so that its 100-second-long timing cycle must begin anew. In this embodiment the duration of the timing cycle performed by timing stage 21 must exceed the time interval between successive test pulses produced by test-pulse generator 18.

In contrast, if one or both of the two threshold levels is not exceeded, i.e., the HF-sensitivity threshold level associated with stage 7 and the LF output-signal level associated with stage 15, then not all inputs of AND-gate 13 will receive "1" signals, a "1" pulse will not appear at the output of gate 13, and no external reset pulse will appear at the output of delay or timing stage 21; instead, the latter will repeatedly perform, without interruption from AND-gate 13, its 100-second-long timing cycles, and will at the end of each one of these produce an output signal.

During a pause in reception, whether due to a pause in the broadcast transmission or due to the appearance of a malfunction, the reception-occurring signal on line 24, as already explained, disappears, thus rendering switch 22 conductive. Thus, during actual test-signal cycles, if a malfunction-indicating signal does actually appear at the output of timing stage 21, it will be transmitted via switch 22 to the input 23 of malfunction-responsive device 27.

During the 100-ms duration of the test pulse, switch 8 is held non-conductive by the test pulse present at the output of test-pulse generator 18, through the intermediary of delay stage 25. This is necessary, in the embodiment illustrated, because the threshold stage 7 here used to monitor HF sensitivity also happens to be part of the receiver's squelching circuitry. I.e., if switch 8 were not kept open during the test-pulse cycle, it would furnish to line 24 an improper reception-occurring signal which would activate reception-responsive device 28 and, more importantly, would disable test-pulse generator 18 almost as soon as the latter had become enabled, and would also improperly open switch 22 thereby disabling the malfunction-responsive device 27. The delay introduced by stage 25 in this embodiment can, for example, be about 20 ms. Thus, 20 ms after initiation of a test pulse at the output of test-pulse generator 18, switch 8 opens and is held open so long as the test pulse itself continues in existence.

Actually, in the illustrated embodiment, i.e., in which part of the squelching circuitry happens to be employed for HF-sensitivity monitoring also, the delay stage 25 discussed immediately above also serves a second purpose. As stated immediately above, 20 ms after initiation of a test pulse stage 25 opens switch 8 and keeps switch 8 open for the remaining duration of the test pulse. Additionally, however, stage 25 continues to keep switch non-conductive for 20 ms subsequent to termination of the test pulse. This is advantageous, because the "1" signal produced on line 12 during the test-pulse cycle will, upon termination of the test pulse, continue in existence for a certain length of time thereafter due to the presence of the delay stage 26. If this continued "1" signal at the output of delay stage 26 were allowed to pass through switch 8, this could undesirably result in brief activation of squelch switch 5 at improper times. Indeed, even with delay stage 25 keeping switch 8 non-conductive for an extra 20 ms subsequent of to test-pulse termination, the already discussed 40-ms delay of delay stage 26 could lead to exactly this undesirable occurrence, if some countermeasure were not taken; i.e., the "1" signal at the output of stage 26 would still be present for an extra 20 ms subsequent to closing of switch 8. Accordingly, in the present embodiment, it is preferred to use, for delay stage 26, a delay stage of the type which introduces a time delay (e.g., the aforementioned 40 ms) in its transmission of the leading flank of the "1" pulse produced at the output of threshold stage 7, but does not introduce this time delay in its transmission of the trailing flank of such "1" pulse.

This can be accomplished by providing the time-delay capacitor(s) internal to delay stage 26 with a short-circuiting or capacitor-discharge transistor switch, so connected that it becomes non-conductive in response to a "1" signal applied to the input of stage 26 and becomes conductive again in response to a "0" signal applied to the input of stage 26. Thus, when at the start of the test-pulse cycle threshold stage 7 produces an outut "1" pulse, the leading flank of the pulse, being at level "1", renders such short-circuiting switch non-conductive, so that the time-delay capacitor(s) internal to delay stage 26 can charge and introduce a time delay. In contrast, the trailing flank of the "1" pulse produced by stage 7 renders such short-circuiting switch conductive, thereby short-circuiting the internal time-delay capacitor(s) and negating the time delay action which such capacitor(s) would introduce.

If a test-pulse cycle has just been performed and before the next one starts, an actual broadcast reception begins to occur, i.e., received via antenna 10, the resulting signal applied to the input of switch 8 is transmitted to the output thereof (switch 8 being conductive intermediate test pulses), and is transmitted to the control input of squelch switch 5, rendering the latter conductive. This same signal is also transmitted via line 24 to switch 22, rendering the latter non-conductive, to disable malfunction-responsive device 27 during the course of a malfunction-free reception, and is furthermore transmitted to the control input of test-pulse generator 18, disabling the latter and thereby also assuring that noise generator 19 will not be switched on again during the course of the malfunction-free reception. Also, with a reception-occurring signal now present at the output of switch 8, which does not happen during test-pulse cycles nor in general during reception pauses, the reception-occuring signal is fed back to the control input of threshold stage 7, thereby switching the threshold level of stage 7 from the higher value employed for test-pulse cycles down to the lower value employed for normal-operation squelching purposes.

Besides the advantages already explained, another advantage of the illustrated embodiment is that the broadband noise generator 19 can be of rudimentary design and its particular configuration and operation are not critical for good operation. Also, there is no need for costly shielding of the noise generator from other components of the receiver, because the noise generator need only produce a very low voltage (e.g., 100 microvolts), and furthermore does not even operate during normal reception. Furthermore, because the level of the noise-signal pulse employed is so extremely low, even if the noise signal finds its way into the receiver's antenna and is transmitted therefrom, it will not perceptibly interfere with reception by other radio receivers connected to nearby antennas. Also, a broadband noise signal is easy to adjust and exhibits extremely high long-term or drift stability and temperature stability, i.e., compared to other sorts of test signals which would be applicable for use for all channels receivable by a receiver.

The illustrated embodiment is particularly simple, because it makes use of parts of the squelching circuitry already anyway present in the receiver. Such squelching circuits are often anyway provided with a time-delay stage such as stage 26 in order to prevent a response to extremely short-lasting interference pulses, e.g., such as emanating from automotive ignition systems.

It will be understood that each of the elements described above, or two or more together, may also find a useful application in other types of monitoring techniques and circuits differing from the types described above.

While the invention has been illustrated and described as embodied in a monitoring technique and circuit exploiting parts of the squelching circuitry already present in a radio receiver, it is not intended to be limited to the details shown since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A self-monitoring system for verifying and deverifying proper operation of a radio receiver which is in use, and further for verifying and deverifying proper operation of the system itself, when the radio receiver has a high frequency stage, an intermediate frequency stage and a low frequency stage, comprising:
   a pulse generator generating test pulses of constant duration which are separated from each other by intervals of constant duration, the pulse generator generating test pulses only after receipt of a transmission-pause signal;
   a noise generator cooperating with the high frequency stage and the pulse generator to apply a test signal to the high frequency stage when a test pulse is generated by the pulse generator;
   an intermediate frequency monitor cooperating with the intermediate frequency stage and continuously responsive to any output thereat to generate a transmission signal and a transmission-pause signal, the intermediate frequency monitor operating in a manner that a transmission signal is generated when the output at the intermediate frequency stage is at least equal to a first predetermined threshold value and a transmission-pause signal is generated when the output at the intermediate frequency stage is less than the first predetermined threshold value;
   a first time delay connected to the intermediate frequency monitor in a manner that all signals generated by the intermediate frequency monitor will be passed through the first time delay and delayed therein for a first predetermined interval;
   a low frequency monitor cooperating with the low frequency stage and continuously responsive to any output thereat to generate a low frequency-proper signal and a low frequency-improper signal, the low frequency monitor operating in a manner that a low frequency-proper signal is generated when the output at the low frequency stage is at least equal to a second predetermined threshold value and a low frequency-improper signal is generated when the output of the low frequency stage is less than the second predetermined value;
   a congruance monitor connected to the pulse generator, the first time delay and the low frequency monitor and producing an output signal in response to the test pulses, the transmission and transmission-pause signals, and the low-frequency-proper and low frequency-improper signals, the congruance monitor operating in a manner that the output signal is logically high when a test pulse, a transmission signal and a low frequency-proper signal are present simultaneously and the output signal is logically low otherwise;
   a resettable timer connected to the congruance monitor and responsive to the output signal in a manner that the timer resets upon receipt of a logically high output signal and then begins to time and to continue timing while the output signal is logically low, the timer operating in a manner that when the timer has timed a predetermined period, a malfunction signal is generated;
   a second time delay connected to the pulse generator to receive test pulses generated thereby and operating in a manner that such pulses will be delayed in the second time delay for a second predetermined period;
   a signal block connected to the first time delay, the second time delay and the pulse generator, the signal block blocking all signals passing through and delayed in the first time delay from the pulse generator, while a test pulse delayed by the second time delay is present at the signal block and transmitting said signals to the pulse generator otherwise;
   a malfunction indicator indicating a malfunction in response to receipt of a malfunction signal and failing to indicate a malfunction otherwise; and
   a malfunction signal block connected to the timer, the signal block and the malfunction indicator and responding to signals transmitted by the signal block, the malfunction signal block operating in a manner that when the malfunction signal block receives a transmission signal from the signal block, the malfunction signal is blocked from the malfunction indicator and when the signal block fails to receive a transmission signal, the malfunction signal is transmitted to the malfunction indicator.

2. The system defined in claim 1, further including an attenuator intermediate the noise generator and the high frequency stage to attenuate test signals produced by the noise generator.

3. The system defined in claim 2, wherein the monitors and attenuator are adjustable to vary the first predetermined threshold, the second predetermined threshold, and attenuation.

4. The system defined by claim 1, wherein the redio receiver has a squelch circuit which can be turned on and turned off, and wherein the signal block cooperates with the squelch circuit in a manner that the squelch circuit is turned off when the signal block is transmitting signals and the squelch circuit is turned on when the signal block is blocking signals.

5. A method for monitoring a radio receiver in order to verify and deverify proper operation thereof, when the receiver has a high frequency stage, an intermediate frequency stage and a low frequency stage, the method comprising the following steps:
   applying a test signal to the high frequency stage;
   measuring amplitude of any output at the intermediate frequency stage;
   measuring amplitude of any output at the low frequency stage;
   comparing the amplitude of each of the outputs with a corresponding predetermined threshold amplitude; and
   verifying proper operation of the radio receiver when amplitude of each output at least equals its corresponding threshold amplitude, and deverifying proper operation otherwise, said comparing and the verifying and deverifying step being performed continuously and the monitoring being performed while the receiver is in use.

6. The method defined by claim 5, wherein the applying step takes place when and only when amplitude of an output at the intermediate frequency stage is lower than its predetermined threshold amplitude.

7. The method defined by claim 5, wherein the verifying and deverifying step succeeds the measuring steps by at least a predetermined period of time.

* * * * *